Dec. 22, 1942.   K. NEUMANN   2,306,181

FISH LURE

Filed May 20, 1941

KURT NEUMANN,
INVENTOR

BY
ATTORNEY.

Patented Dec. 22, 1942

2,306,181

UNITED STATES PATENT OFFICE 2,306,181

FISH LURE

Kurt Neumann, Beverly Hills, Calif.

Application May 20, 1941, Serial No. 394,311

3 Claims. (Cl. 43—42)

This invention comprehends the provision of an improved and novel fish lure, or artificial bait and an object is to provide a lure which simulates a form of animal life which is capable of attracting fish when used in casting or trolling and includes, primarily a soft flexible body formed of a suitable material such as sponge rubber, molded to provide a body within which is a fish hook invisibly held in such a manner that it may be extended from the body when the bait is attacked by a fish or the bait is swallowed by the fish and the fish caught.

Although other forms of animal life may be represented by my improved lure, I have shown in the drawing accompanying this application and will describe in the hereinafter following specification for the purpose of illustrating one form of the invention an ordinary grub which in many cases is particularly attractive to fish. In the consideration of the invention, it may be understood that a particular object is to provide a molded body which has a cavity or slit adapted to be normally closed by the inherent tension of the body material and into which the hook is threaded but from which the hook is readily extensible when the body is bent or deflected from its normal position, so as to expose the hook with the barb thereon for snaring the fish attacking the bait.

In the formation of the artificial bait the body is first molded into desired form and thereafter the body is slitted longitudinally with the extremities of the slit terminating short of the ends of the body, and the hook is threaded through an end of the body until the hook is seated in the slit in an obscured position. When properly positioned in the body the hook is extensible laterally from the slit upon a movement of the body in any direction or upon the tensioning of the line on which the hook is held so as to insure the snaring of the fish when the bait is attacked.

Other objects may appear as the description progresses.

I have shown one form of the invention in the accompanying drawing, subject to modification, within the scope of the appended claims. without departing from the spirit of the invention.

The device constitutes a body A integrally or sectionally formed of soft flexible material such as sponge rubber and adapted to be colored and configurated so as to represent any desired form of animal life, the particular form shown simulating an ordinary "grub." The body A may be molded with a cavity or slit 1 therein which is sufficiently shallow to enclose, obscure and retain a hook B therewithin having the usual barb 2. The cavity 1 terminates short of the ends of the body, is open at one side so as to permit the extension of the hook therefrom when the body is bent or distorted and is closed at an opposite side of the body, as shown in Fig. 3.

Figure 1:
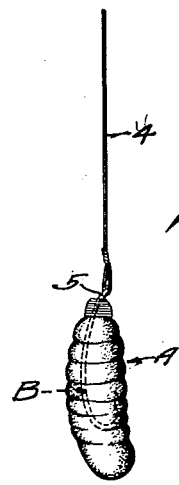
Fig. 1 is a side view of the lure embodying my improvements.
Figure 2:
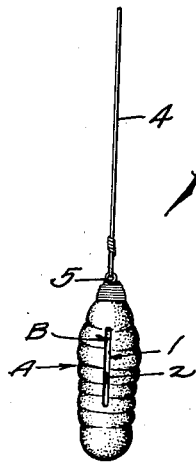
Fig. 2 is a view of the same as seen at right angles to the disclosure of Fig. 1.
Figure 3:
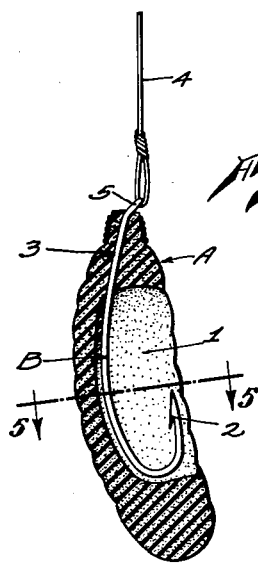
Fig. 3 is an enlarged sectional view on line 3—3 of Fig. 5.
Figure 4:
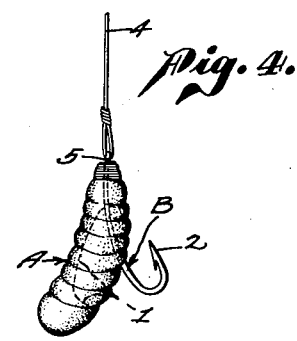
Fig. 4 is a side view with the body bent from a normal position such as is shown in Fig. 1 so as to expose the hook.
Figure 5:
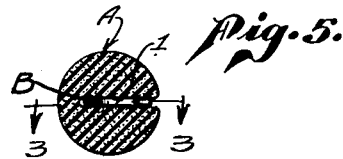
Fig. 5 is a cross sectional view on line 5—5 of Fig. 3.

The body A may be molded with a passage 3 extending through one end of the cavity 1 through which the hook B may be threaded in the assembly of the device, or the hook when reversed end for end from the showing of Fig. 3, may be forced through the end of the body by pressure on the pointed barb 2 until the hook assumes the correct position shown in Fig. 3 for use. A line 4 is suitably attached to the eye 5 of the hook so that when the line is cast as in a fishing operation the bait will be, as usual, under the control of the fisherman, and when the line is tensioned, as when a fish attacks the bait, the hook may be pulled upwardly, as shown in Fig. 3, until the barb 2 is projected from the body A so as to snare the fish or if the body is bent by the fish, as shown in Fig. 4, the hook will be exposed and extended to snaring position regardless of the pull on the line 4.

I am, of course, aware that other lures have been heretofore used which simulate flies and other forms of animal life but in such cases the hook is only partially if at all obscured and as a consequence such devices are many times inadequate and inefficient. It will, therefore be apparent that my improved lure may be provided so as to simulate the form of grasshoppers, worms, mice, frogs and many other forms of life, in color, size and configuration, and being formed of a soft flexible material, will serve to deceive and snare the fish because of the invisibility of the hook and the natural appearance of the artificial bait.

What I claim is:

1. A fish lure comprising: a body formed of soft flexible material simulating a form of animal life and having a cavity extending longitudinally and open at but one side thereof and closed at its ends, and a hook held in an end of said body and wholly seated in said cavity so as to be invisible when the body is normally disposed but extensible from the body when the body is distorted, said body having a passage extending through the leading end of said body through which the shank of said hook is extended for supporting the hook in said cavity.

2. A fish lure comprising: a body formed of soft flexible material simulating a form of animal life and having a cavity extending longitudinally and open at a side thereof and closed at its ends, and a hook held in an end of said body and wholly seated in said cavity so as to be invisible when the body is normally disposed but extensible from the body when the body is distorted, the diameter of said body being greater than the width of the hook over its barb, the portion of the body service to support the hook being relatively short so as to permit the flexing of the body on the shaft of the hook for exposing the barbed portion of the hook.

3. A fish lure comprising: a body formed of soft flexible material simulating a form of animal life and having a cavity extending longitudinally and open at one side and closed at both ends thereof, and a hook held in the leading end of said body and wholly seated in said cavity so as to be invisible when the body is normally disposed but extensible from the body when the body is distorted so as to expose the major portion of the hook from its barb to said leading end, the inherent tension of said body serving to normally conceal said hook in said cavity.

KURT NEUMANN.